June 13, 1950 W. R. SCHINDLER 2,511,417
MACHINE FOR MANUFACTURING PAPER PLANT PROTECTORS
Filed Dec. 31, 1948 8 Sheets-Sheet 1
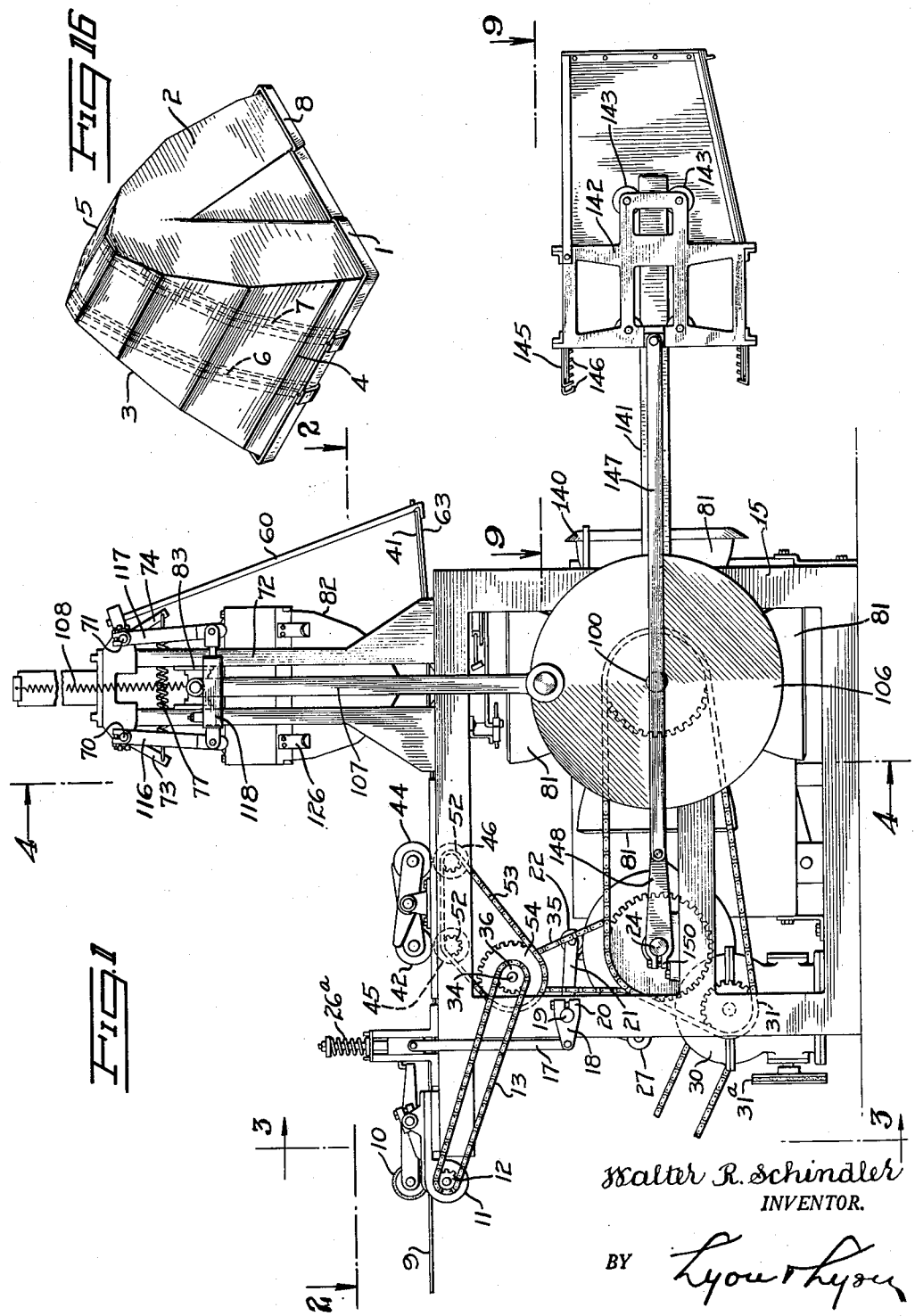
Walter R. Schindler
INVENTOR.
BY Lyon & Lyon
Attorneys

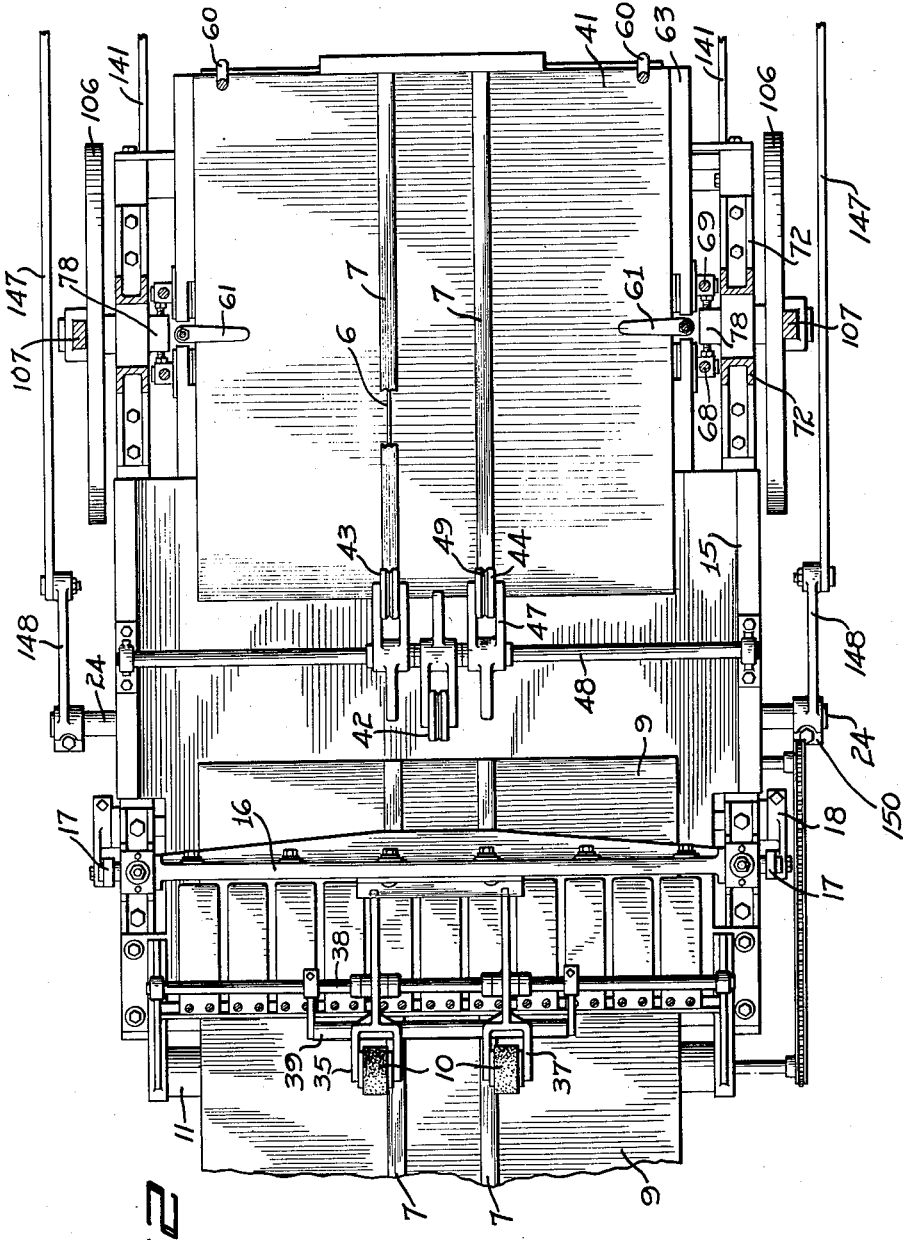

June 13, 1950 W. R. SCHINDLER 2,511,417
MACHINE FOR MANUFACTURING PAPER PLANT PROTECTORS
Filed Dec. 31, 1948 8 Sheets-Sheet 3
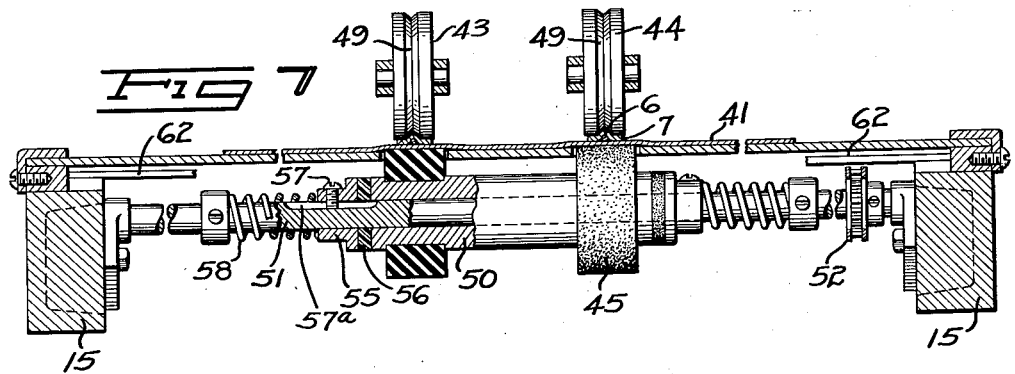
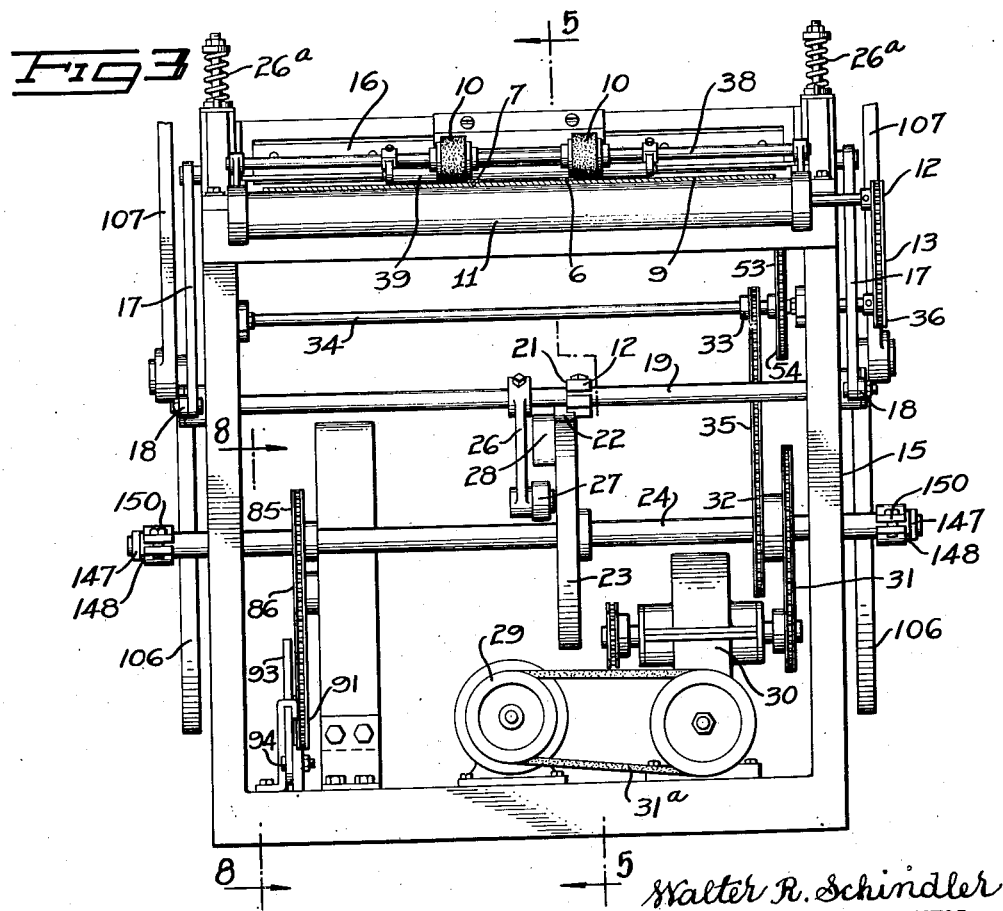
Walter R. Schindler
INVENTOR.
BY Lyon & Lyon
Attorneys

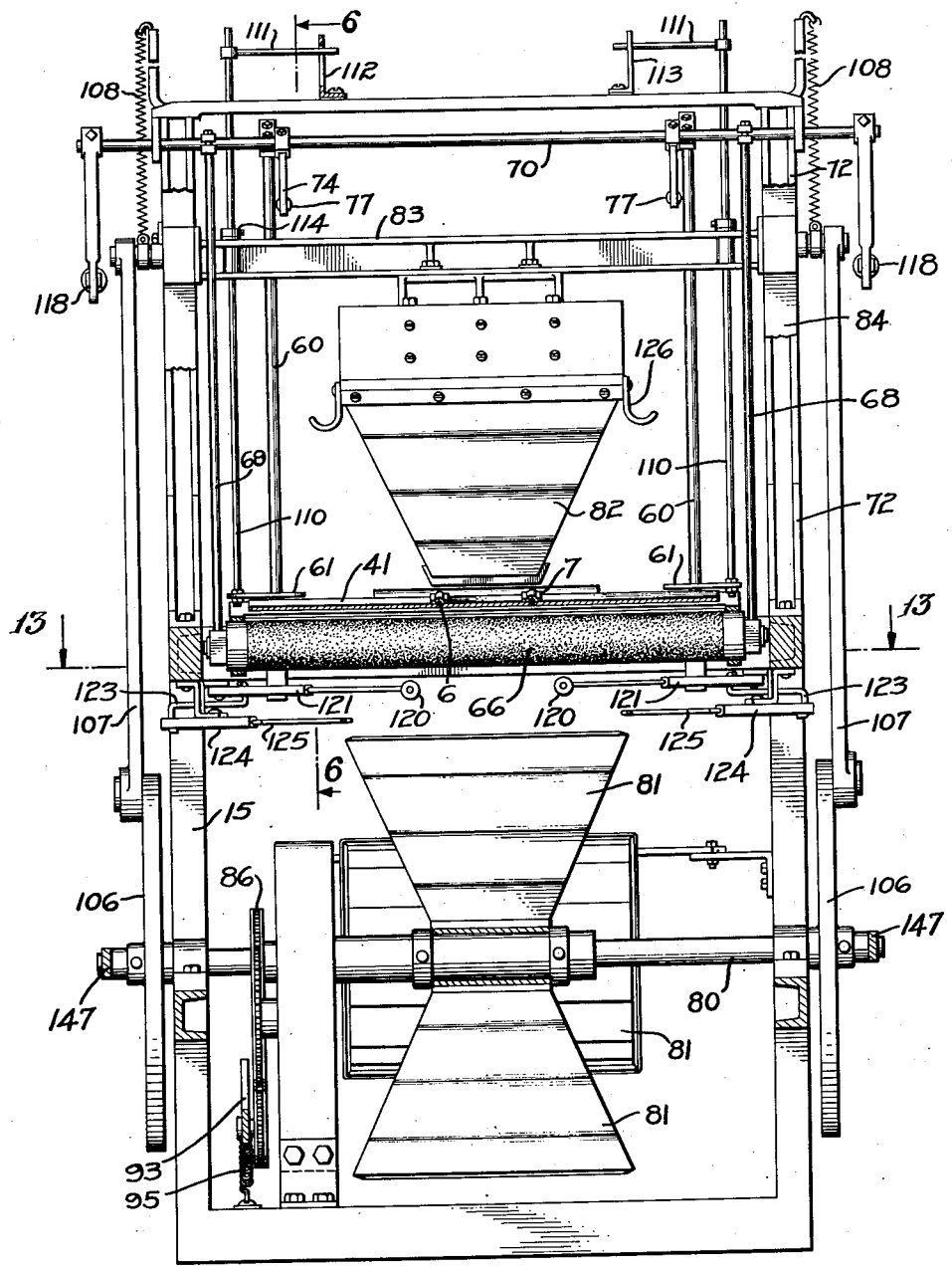

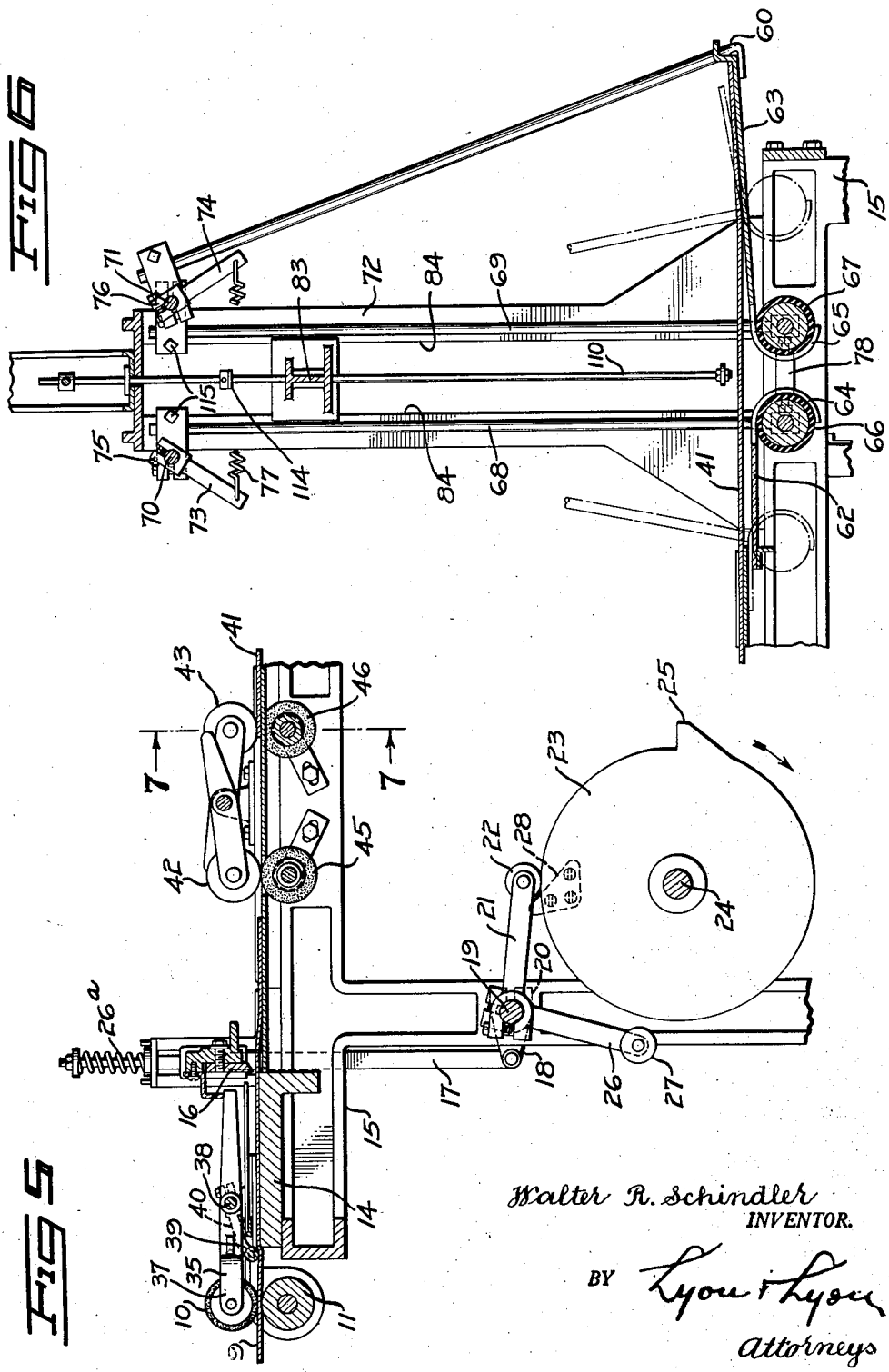

June 13, 1950 W. R. SCHINDLER 2,511,417
MACHINE FOR MANUFACTURING PAPER PLANT PROTECTORS
Filed Dec. 31, 1948 8 Sheets-Sheet 6

Walter R. Schindler
INVENTOR.
BY Lyon & Lyon
Attorneys

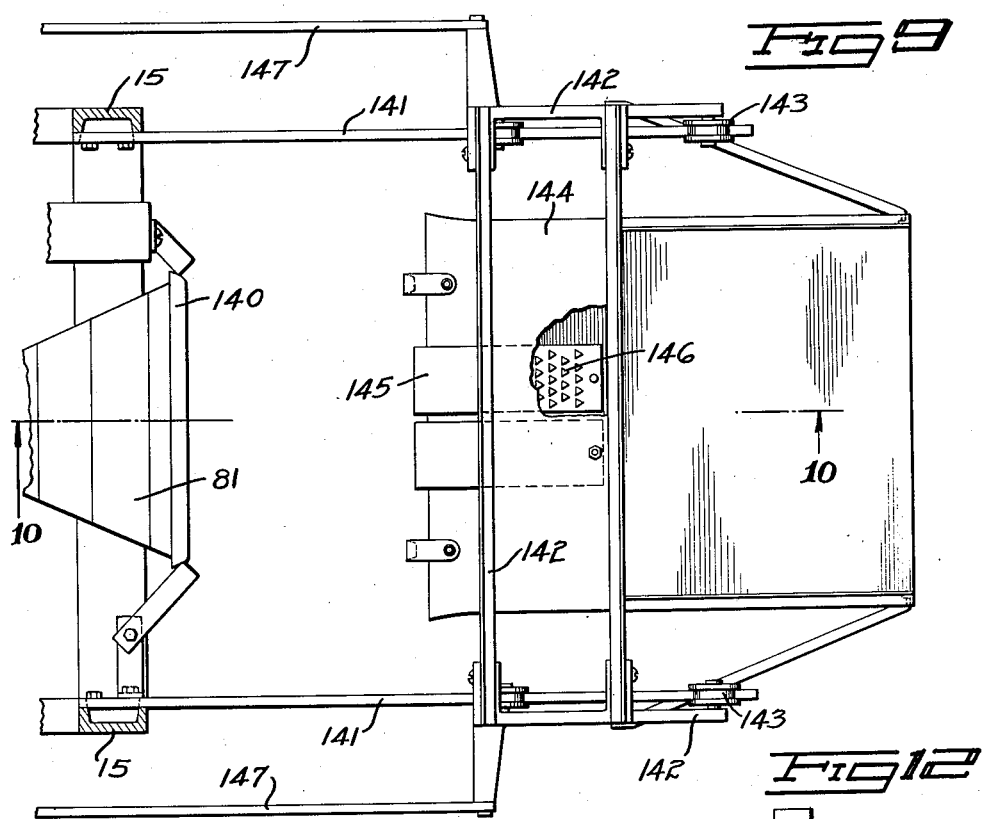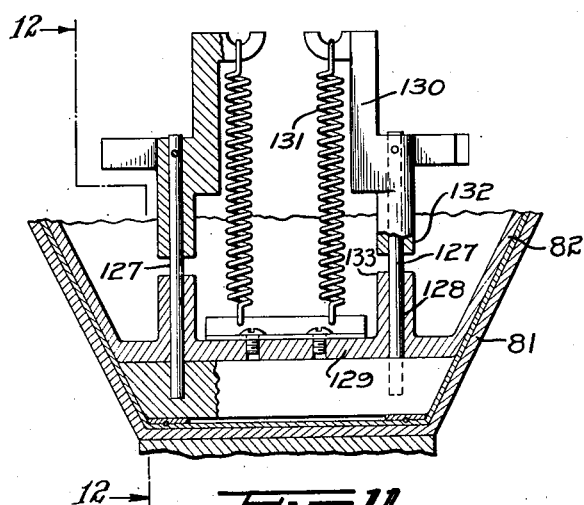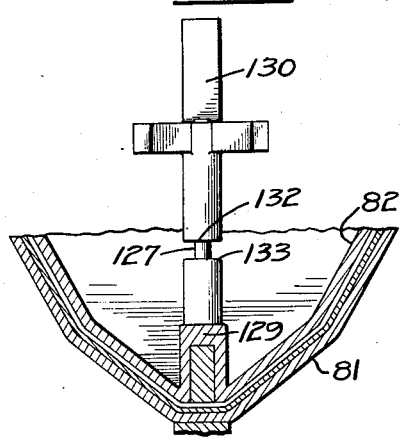

June 13, 1950 W. R. SCHINDLER 2,511,417
MACHINE FOR MANUFACTURING PAPER PLANT PROTECTORS
Filed Dec. 31, 1948 8 Sheets-Sheet 8
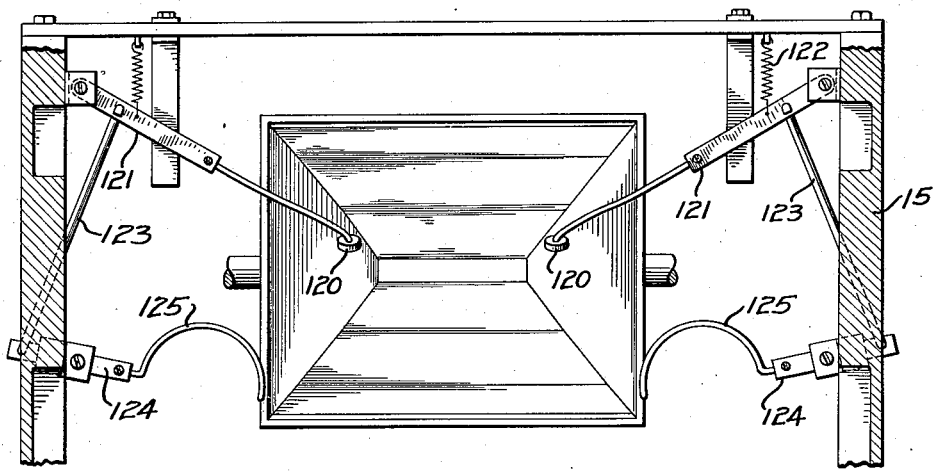
Fig 13
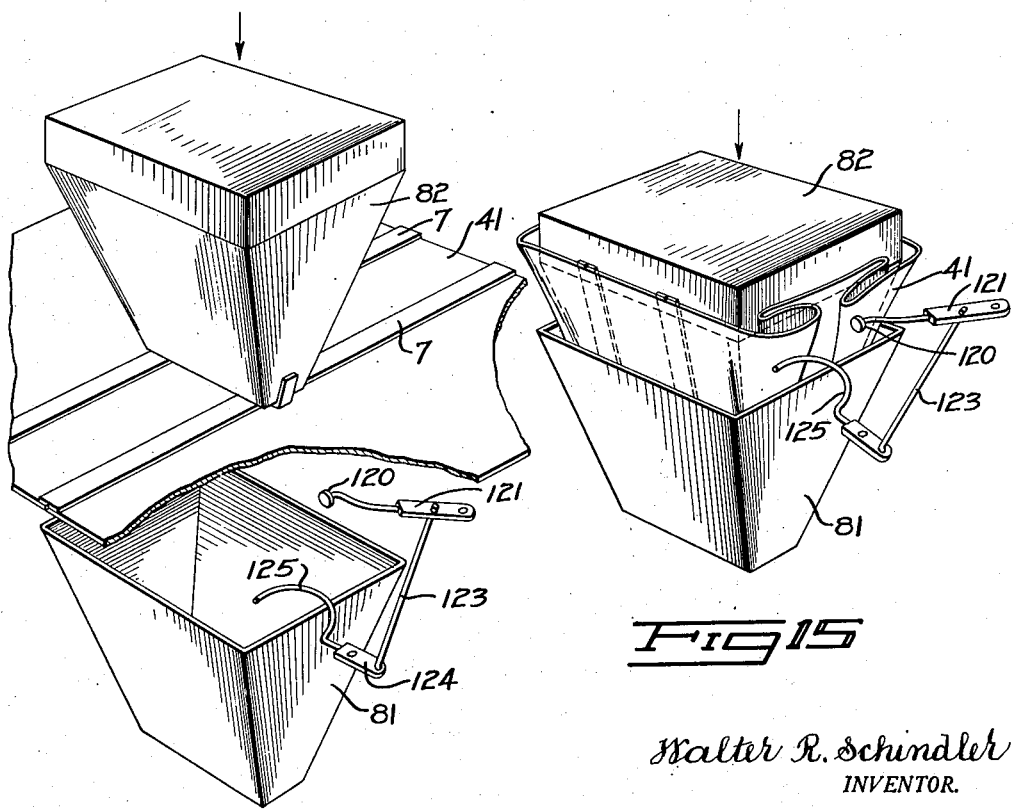
Fig 14
Fig 15
Walter R. Schindler
INVENTOR.
BY Lyon & Lyon
Attorneys Patented June 13, 1950

2,511,417

UNITED STATES PATENT OFFICE 2,511,417

MACHINE FOR MANUFACTURING PAPER PLANT PROTECTORS

Walter R. Schindler, Los Angeles, Calif., assignor to Hot Kap Manufacturing Company, Los Angeles, Calif., a partnership Application December 31, 1948, Serial No. 68,565

7 Claims. (Cl. 93—1)

My invention comprises a machine for manufacturing paper plant protectors and more specifically to a machine for manufacturing a reinforced paper tent which is placed over growing plants to protect them from the weather.

Other objects and advantages of my invention will be apparent from the following description of the preferred embodiments thereof.

In the drawings:

Figure 1 is a side elevational view of my machine;

Figure 2 is a top plan view taken on the line 2—2 of Figure 1;

Figure 3 is an elevation taken on the line 3—3 of Figure 1;

Figure 4 is a section taken on the line 4—4 of Figure 1;

Figure 5 is a side elevation taken on the line 5—5 of Figure 3;

Figure 6 is a section taken on the line 6—6 of Figure 4;

Figure 7 is a section taken on the line 7—7 of Figure 5;

Figure 9 is a top plan view taken on the line 9—9 of Figure 1;

Figure 11 is a section taken on the line 11—11 of Figure 10;

Figure 12 is a section taken on the line 12—12 of Figure 11;

Figure 13 is a section taken on the line 13—13 of Figure 4;

Figure 14 is a perspective view of the male and female dies in open position;

Figure 15 is a perspective view of the male and female dies in closed position; and Figure 16 is a perspective view of the plant protector manufactured by my machine.

Figure 8:
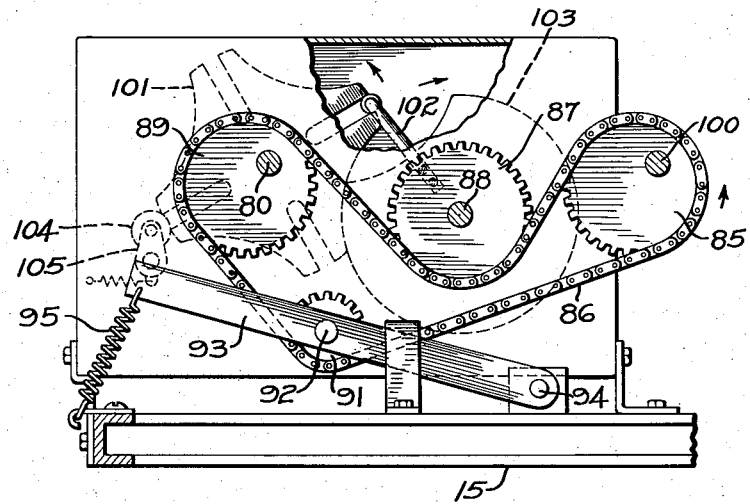
Figure 8 is a section taken on the line 8—8 of Figure 3.
Figure 10:
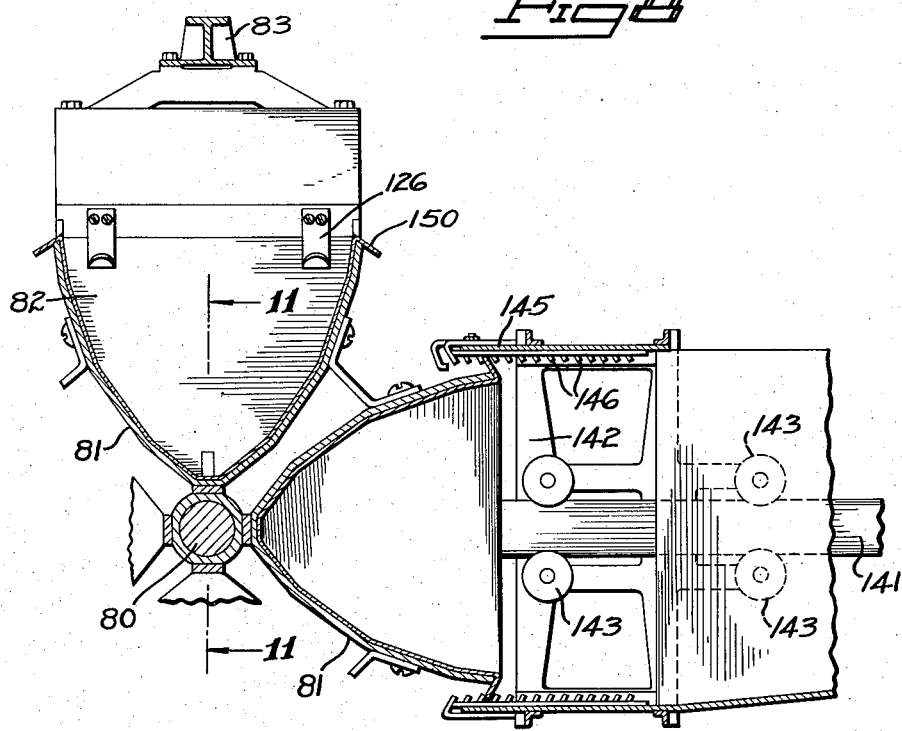
Figure 10 is a section taken on the line 10—10 of Figure 9.

The machine of my present invention is adapted for use in conjunction with my copending application on a machine for manufacturing reinforced paper and the present invention uses the reinforced paper formed by the machine described in that application. Such paper comprises a continuous sheet of waxed paper which has two parallel wires attached thereto and glued in position by paper straps glued over the wire on to the sheet.

In Figure 16 is illustrated a perspective view of the plant protector manufactured by this invention. The plant protector or tent is formed of a single blank of paper and by the use of male and female dies it is shaped and folded to make a paper protector 1 having a rectangular bottom with ends 2 and 3 extending upwardly therefrom and sides 4 and 5. Over the sides 4 and 5 in a continuous form is attached a reinforcing wire 6 glued to the body of the paper tent by paper straps 7. The bottom of the paper protector is open and to reinforce the same a cuff 8 extends around the perimeter of the base. These paper tents are placed over young plants to protect them from the weather.

Into the machine of my present invention is fed a continuous sheet of waxed paper 9 to form the above-set-forth paper tent. This waxed paper has the wires 6 and paper straps 7 running continuous of its length. My present invention is preferably situated adjacent the end of the machine for manufacturing reinforced paper as set forth above so that the product of that machine passes therefrom into the machine comprising the present invention.

The reinforced paper 9 is fed in between a pair of pressure rollers 10 and 11 which are driven by means of a sprocket 12 and chain 13 at a constant speed. The pressure rolls 10 are formed of sponge rubber and the rollers 11 are of steel or other hard material. The paper 9 is fed on to a bed plate 14 mounted upon a frame 15 past a cutter knife 16. The cutter knife 16 is actuated in an up and down movement by push rods 17 connected to lever arms 18 fulcrumed to the journaled shaft 19 by a clevis 20.

Attached to the shaft 19 is an actuating arm 21 carrying a cam roller 22 at its opposite end. The cam roller 22 is adapted to ride upon a cam 23 on a shaft 24. The cam 23 is adapted to operate in a clockwise direction as shown by the arrow in Figure 5 and when the cam roller 22 strikes the boss 25 on the cam 23, the lever 21 is lifted, rotating the shaft 19, forcing downwardly the lever arms 18 and push rods 17, pulling down the cutter 16. After the boss 25 has gone past the cam roller 22 the roller 22 returns to the normal surface of the cam 23 by the action of the spring 26 which raises the cutter 16. As the cutter 16 is operating through wire and paper it may stick and I therefore provide an arm 26 on the shaft 19 with a roller 27 at its end adapted to be struck by a cam block 28 on the cam 23 to rotate the shaft 19 and lift the push rods 17 and cutter 16. The cutter 16 thus slices off the sheet of paper 9 into the desirable lengths or sections 41 for forming a plant protector. The cam 23 is made of such size and length as to cut off the desired lengths of paper for one tent.

A prime mover such as an electric motor 29 drives the shaft 24 at a constant speed by means of a train of gears 30 and chain 31. A sprocket 32 on the shaft 24 drives the sprocket 33 on the shaft 34 by means of the chain 35. A sprocket 36 on the shaft 34 is connected to the sprocket 12 by the chain 13.

To permit the insertion of the paper 9 in the machine the pressure rolls 10 are rotatably held in position by clevises 37 attached to a shaft 38 journaled to the frame 15.

An idler pressure roll 39 is held in position by the arms 40 attached to the shaft 38. By rotation of the shaft 38 both the rollers 10 and 39 may be lifted to permit insertion of the paper 9 on to the bed plate 14.

The paper 9, at the time that it is cut off into a section 41 of a size to form a plant protector, extends between the speed-up rollers 42, 43, 44, 45 and 46. The rollers 42, 43, and 44 are held by clevises 47 upon a shaft 48 journaled to the frame 15, and are free to rotate in their clevises. These rolls 42, 43 and 44 are made of steel or other similar material, and have triangular grooves 49 to engage upon the paper 9 or section 41 directly over the wires 6.

The rolls 45 and 46 are made of sponge rubber and are positioned directly under the rolls 42, 43 and 44. The rolls 45 and 46 are mounted upon a sleeve 50 rotatively positioned on the shaft 51.

The shaft 51 is driven by a sprocket 52 and chain 53, connecting the sprockets 52 with a sprocket 54 on the shaft 34. However, the sprocket 54 is larger than either of the sprockets 52, so that the rotation of the shaft 51 is at a higher speed than the rotation of the roller 11.

A clutch mechanism comprises a collar 55 upon the shaft 51 adjacent one end of the sleeve 50. Between the collar 55 and the sleeve 50 is positioned a rubber slip washer 56. The collar 55 is held to the shaft 51 by a setscrew 57 engaging a keyway 57a, and is urged toward the sleeve 50 by a spring 58 to place a pressure upon the washer 56 when the paper 9 passes under the cutter 16 and between the speed-up rollers. Prior to the cutting-off action by the cutter 16 the sleeve 50 will slide on the shaft 51 without speeding up the movement of the paper 9. However, after the paper 9 is released by the action of the cutter 16 slicing it off and forming it into a section 41, the pressure of the collar 55 and the washer 56 will cause the sleeve 50 and rollers 45 and 46 to turn at the accelerated speed, thus giving added impetus to the paper section 41 to clear it out of position ready for the reception of another section of paper to be cut off by the cutter 16. The speed-up rollers 42 to 46, inclusively, force the paper section 41 into position against the stops 60 and under the guides 61.

At this position the paper is supported upon a pair of guide plates 62 and 63 which have grooved under surfaces 64 and 65 around forming rolls 66 and 67. The forming rolls 66 and 67 are supported by rods 68 and 69 from shafts 70 and 71 journaled on a hanger 72 extending upwardly from the frame 15.

Arms 73 and 74 are attached to the shafts 70 and 71 by clevises 75 and 76. Springs 77 connect the arms 73 and 74 to swing the rods 68 and 69 towards each other, urging the forming rolls 66 and 67 towards each other.

Spacers 78 are provided to maintain the forming rolls 66 and 67 partially separated. Directly below the forming rolls 66 and 67, and centered thereon, is a shaft 80 journaled in the frame 15 and carrying thereon four equally spaced female dies 81. The shape of the female dies is the same as the outside shape of the finished plant protector tent 1.

It should be noted that the female dies are mounted at the four poles of the shaft 80, and one is open to receive the paper section 41 as it is pressed down by the male die 82.

The male die 82 is supported by the cross-beam 83 which is adapted to slide up and down in guides 84 in the hanger 72. An off-center sprocket 85 is carried by the shaft 100 and the chain 86 passes around the sprocket 85 over a sprocket 87 on a shaft 88 over an eccentric sprocket 89 on the shaft 80 and around an idler sprocket 91 mounted upon a shaft 92 journaled upon the arm 93 pivotally attached to the frame 15 at 94.

A spring 95 maintains tension upon the sprocket 91 to hold the chain 86 tight upon the sprockets 85, 87, 89 and 91.

The shaft 100 is driven by the chain 31 from the prime mover 29. Attached to the shaft 80 is a Geneva gear 101, which is driven by the dog 102 carried upon a Geneva cam 103 attached to the shaft 88. The dog 102 thus rotates the Geneva gear 101 in quarter turns at an intermittent motion as the shaft 88 is revolved by the chain 86.

The shaft 88 and the sprocket 87 are not rotated at a constant speed because of the off-center positions of the sprockets 85 and 89. As the dog 102 engages the Geneva gear 101 this off-centering causes the rotation of the shaft 88 to be speeded up, thus giving a sharp, quick motion to the Geneva gear 101. A cam follower 104, mounted upon a clevis 105 is adapted to follow the Geneva gear 101, and after the dog 102 has rotated the Geneva gear 101 a quarter turn the cam follower 104 maintains it in a fixed position until the next revolution of the Geneva cam 103.

Rotation of the Geneva gear 101 causes the shaft 80 to rotate the female dies 81 a quarter turn, thus placing a different one under the male die at each quarter rotation of the shaft 80. The shaft 80 carries a flywheel 106 at each end thereof. On the flywheel 106, near the perimeter, are journaled the push rods 107 which are connected with the cross-beam 83.

Rotation of the shaft 80 and flywheel 106 causes the cross-beam 83 to be raised and lowered in cycle with the rotation of the female die 81. Thus at each quarter turn of the shaft 80 the male die 82 is forced into the female die 81 by pulling the cross-beam 83 downwardly by the push rods 107. To help in returning the male die to its upper position and to take a portion of the strain, the springs 108 are attached to the cross-beam 83.

As the male die 82 descends it carries with it the rods 110 which are slidable therein, and which carry at their lower extremities the guides 61. The weight of the guides 61 and the rods 110 hold the paper section 41 in position and prevent it from bulging up as the male die 82 strikes. In fact, the guides 61 start the paper section 41 downwardly between the forming rolls 66 and 67, and prevent the sides from curling inwardly. The rods 110 have at their upper extremities shafts 111 which extend laterally and pass through slots 112 in brackets 113. When the shafts 111 strike the bottom of the slots 112, further downward motion of rods 110 and guides 61 is stopped. Upon the upper movement of the cross-beam 83 the rods 110 are lifted by the collars 114 engaging the top of the cross-beam.

As the male die 82 strikes the paper section 41 and forces the same downwardly between the forming rolls 66 and 67, the forming rolls are spread apart as rods 68 and 69 are pivoted at 115 to the hanger 72. This spreads the forming rolls 66 and 67, and 62 and 63, so that the paper section 41 is pressed by the male die 82 downwardly into the female die 81. Upon the return stroke of the male die the springs 77 pull the forming rolls 66 and 67 back together against the spacer 78. To dampen this action and to prevent any jar, I provide the arms 116 and 117 which are connected together by the damping cylinder 118 which allows the spring to pull the rods 68 and 69 back together, but not with a hard crash.

The shape of the male and female dies 82 and 81 are clearly shown in Figures 14 and 15, respectively.

To cause a more perfect folding of the paper section 41 as it enters the female die 81, guide rolls 120 mounted on arms 121 pivoted on the frame 15 are used. These force the paper section 41 to enter the female die 81 more perfectly, and are held in tension against it by the springs 122. A lever 123 attached intermediate the arms 121 causes a rotation of a lever 124 and actuates the guides 125 against the paper, also aiding in maintaining the paper in a better folded condition.

To form the cuff 8 upon the paper protector flanges 126 are provided upon the male die 82 which cooperate with the flanges 150 on the female die 81. To insure that the male die will make a striking blow when it enters the female die 82, and also a jerky action during its withdrawal, the male die 82 is connected to cross-beam 83 by means of pistons 127 sliding in the bores 128 in the subframe 129 of the male die 82. The pistons 127 are attached to a hanger 130 attached to the cross-beam 83. Springs 131 are provided between the hanger 130 and the subframe 129. As the male die 82 is pressed downwardly the lower ends 132 of the hanger 130 strike the upper edges 133 of the subframe 129, giving the same a jolt. Upon raising the cross-beam 83 the hanger 130 first rises, separating the surfaces 132 and 133 until the tension generated in the spring 131 is sufficient to snap the entire male die 82 out of the female die 81.

The pistons 127 in the bores 128 act as guides to maintain the entire male die 82 in alignment.

As the paper protector tents 1 are formed in the female die upon each quarter rotation of the female die 81, one tent remains in the position shown at 140 in Figure 1. To remove the tent 140 from the female die 81, I provide guide arms 141 attached to the frame 15, extending downwardly thereon, upon which a hanger frame 142 is supported by guide rollers 143. The hanger frame 142 is attached to a tent catcher 144 which has projecting hooks 145 with a plurality of catching fingers 146 extending toward the tent 140.

Links 147 connect the hanger frame 142 with lever arms 148 held upon the shaft 24 by clevises 150. As the shaft 24 is rotated the arms 148 are caused to rotate, pulling the links 147 inwardly and outwardly, so that the hanger frame 142 moves back and forth on the guide arms 141 and the projecting hooks 145 engage the tents 140, pulling these tents from the female die. As successive tents are removed from the female die 81 the prior tents are forced inwardly on the fingers 146 until the catcher 144 is full, whereupon an operator can grab an entire stack of tents at one time for shipping.

While I have described the preferred embodiments of my invention, I am not limited to any of the details herein set forth except as described in the following claims.

I claim:

1. In a machine of the class described, a bed frame, a pair of feed rollers driven at a constant speed by a prime mover and adapted to feed a sheet of paper onto said frame, a cutting mechanism adapted to cut said sheet into substantially equal sections, speed rolls carried by said bed frame and adapted to urge said paper along said bed frame, a slipping clutch connecting said speed rolls and said prime mover and adapted to engage and drive said cut-off paper sections at a higher speed than said feed rollers, male and female dies carried by said bed frame and adapted to shape said paper section into a paper tent, said speed rollers feeding said paper sections into a guide between said male and female dies, said guide comprising a pair of forming rolls each pivotally suspended upon a hanger rod supported above said bed frame and adapted to spread and act as guides, means to maintain said forming rolls in spaced relationship, said male die mounted upon a vertical guide member and connected to said prime mover by a Geneva movement whereby said male die is forced into said female die in periodic movements and carries a paper section with it, and a guide rod carried by said male die and adapted to strike said paper section and start its movement between said forming rolls prior to contact by said male die.

2. In a machine of the class described, a bed frame, a pair of feed rollers driven at a constant speed by a prime mover and adapted to feed a sheet of paper onto said frame, a cutting mechanism adapted to cut said sheet into substantially equal sections, speed rolls carried by said bed frame and adapted to urge said paper along said bed frame, a slipping clutch connecting said speed rolls and said prime mover and adapted to engage and drive said cut-off paper sections at a higher speed than said feed rollers, male and female dies carried by said bed frame and adapted to shape said paper section into a paper tent, said speed rollers feeding said paper sections into a guide between said male and female dies, said guide comprising a pair of forming rolls each pivotally suspended upon a hanger rod supported above said bed frame and adapted to spread and act as guides, means to maintain said forming rolls in spaced relationship, said male die mounted upon a vertical guide member and connected to said prime mover by a Geneva movement whereby said male die is forced into said female die in periodic movements and carries a paper section with it, a guide rod carried by said male die and adapted to strike said paper section and start its movement between said forming rolls prior to contact by said male die, and guide members to fold said paper sections.

3. In a machine of the class described, a bed frame, a pair of feed rollers driven at a constant speed by a prime mover and adapted to feed a sheet of paper onto said frame, a cutting mechanism adapted to cut said sheet into substantially equal sections, speed rolls carried by said bed frame and adapted to urge said paper along said bed frame, a slipping clutch connecting said speed rolls and said prime mover and adapted to engage and drive said cut-off paper sections at a higher speed than said feed rollers, male and female dies carried by said bed frame and adapted to shape said paper section into a paper tent, said speed rollers feeding said paper sections into a guide between said male and female dies, said male die mounted upon a vertical guide member and connected to said prime mover by a Geneva movement whereby said male die is forced into said female die in periodic movements and carries a paper section with it, said male die having anvil means therein to jolt said male die at the end of its downward stroke and spring means to snap said die out of said female die on its upward stroke.

4. In a machine of the class described, a bed frame, a pair of feed rollers driven at a constant speed by a prime mover and adapted to feed a sheet of paper into said frame, a cutting mechanism adapted to cut said sheet into substantially equal sections, speed rolls carried by said bed frame and adapted to urge said paper along said bed frame, a slipping clutch connecting said speed rolls and said prime mover and adapted to engage and drive said cut-off paper sections at a higher speed than said feed rollers, male and female dies carried by said bed frame and adapted to shape said paper section into a paper tent, said speed rollers feeding said paper sections into a guide between said male and female dies, said guide comprising a pair of forming rolls each pivotally suspended upon a hanger rod supported above said bed frame and adapted to spread and act as guides, and means to maintain said forming rolls in spaced relationship, said male die mounted upon a vertical guide member and connected to said prime mover by a Geneva movement whereby said male die is forced into said female die in periodic movements and carries a paper section with it, said male die having anvil means therein to jolt said male die at the end of its downward stroke and spring means to snap said die out of said female die on its upward stroke.

5. In a machine of the class described, a bed frame, a pair of feed rollers driven at a constant speed by a prime mover and adapted to feed a sheet of paper onto said frame, a cutting mechanism adapted to cut said sheet into substantially equal sections, speed rolls carried by said bed frame and adapted to urge said paper along said bed frame, a slipping clutch connecting said speed rolls and said prime mover and adapted to engage and drive said cut-off paper sections at a higher speed than said feed rollers, male and female dies carried by said bed frame and adapted to shape said paper section into a paper tent, said speed rollers feeding said paper sections into a guide between said male and female dies, said male die mounted upon a vertical guide member and connected to said prime mover by a geneva movement whereby said male die is forced into said female die in periodic movements and carries a paper section with it, said male die having anvil means therein to jolt said male die at the end of its downward stroke and spring means to snap said die out of said female die on its upward stroke, said female die comprising a plurality of similar dies equally spaced around a rotatable shaft, and means to rotate said shaft so that said male die enters a different one of said female die on each of its periodic strokes.

6. In a machine of the class described, a bed frame, a pair of feed rollers driven at a constant speed by a prime mover and adapted to feed a sheet of paper onto said frame, a cutting mechanism adapted to cut said sheet into substantially equal sections, speed rolls carried by said bed frame and adapted to urge said paper along said bed frame, a slipping clutch connecting said speed rolls and said prime mover and adapted to engage and drive said cut-off paper sections at a higher speed than said feed rollers, male and female dies carried by said bed frame and adapted to shape said paper section into a paper tent, said speed rollers feeding said paper sections into a guide between said male and female dies, said guide comprising a pair of forming rolls each pivotally suspended upon a hanger rod supported above said bed frame and adapted to spread and act as guides, means to maintain said forming rolls in spaced relationship, said male die mounted upon a vertical guide member and connected to said prime moved by a Geneva movement whereby said male die is forced into said female die in periodic movements and carries a paper section with it, said male die having anvil means therein to jolt said male die at the end of its downward stroke and spring means to snap said die out of said female die on its upward stroke, said female die comprising a plurality of similar dies equally spaced around a rotatable shaft, and means to rotate said shaft so that said male die enters a different one of said female dies on each of its periodic strokes.

7. In a machine of the class described, a bed frame, a pair of feed rollers driven at a constant speed by a prime mover and adapted to feed a sheet of paper onto said frame, a cutting mechanism adapted to cut said sheet into substantially equal sections, speed rolls carried by said bed frame and adapted to urge said paper along said bed frame, a slipping cultch connecting said speed rolls and said prime mover and adapted to engage and drive said cut-off paper sections at a higher speed than said feed rollers, male and female dies carried by said bed frame and adapted to shape said paper section into a paper tent, said speed rollers feeding said paper sections into a guide between said male and female dies, said male die mounted upon a vertical guide member and connected to said prime mover by a Geneva movement whereby said male die is forced into said female die in periodic movements and carries a paper section with it, said male die having anvil means therein to jolt said male die at the end of its downward stroke and spring means to snap said die out of said female die on its upward stroke, said female die comprising a plurality of similar dies equally spaced around a rotatable shaft, and means to rotate said shaft so that said male die enters a different one of said female dies on each of its periodic strokes, a catcher mounted upon guides and having fingers to engage the paper tents formed in said female dies, said catcher actuated by said prime mover to enter and withdraw from said female dies to withdraw said paper tents.

WALTER R. SCHINDLER.

REFERENCES CITED

The following references are of record in the file of this patent:

UNITED STATES PATENTS

| Number | Name | Date |
| --- | --- | --- |
| 1,291,482 | Greenstreet | Jan. 14, 1919 |
| 1,757,804 | Joplin | May 6, 1930 |
| 2,136,990 | Daller | Nov. 15, 1938 |